US006130707A

United States Patent [19]

Koller et al.

[11] Patent Number: 6,130,707
[45] Date of Patent: Oct. 10, 2000

[54] VIDEO MOTION DETECTOR WITH GLOBAL INSENSITIVITY

[75] Inventors: David P. Koller, State College; Joseph P. Preschutti, Boalsburg, both of Pa.

[73] Assignee: Philips Electronics N.A. Corp., New York, N.Y.

[21] Appl. No.: 08/834,072

[22] Filed: Apr. 14, 1997

[51] Int. Cl.[7] .......... H04N 7/18

[52] U.S. Cl. .......... 348/155; 340/511; 340/567; 382/1; 382/41; 382/44; 382/56

[58] Field of Search .......... 348/416, 699, 348/155, 152, 154; 340/324

[56] References Cited

U.S. PATENT DOCUMENTS

| | | | |
|---|---|---|---|
| 3,988,533 | 10/1976 | Mick et al. | 340/324 |
| 4,227,212 | 10/1980 | Woolfson et al. | 358/126 |
| 4,270,143 | 5/1981 | Morris | 358/125 |
| 4,458,266 | 7/1984 | Mahoney | 358/105 |
| 4,894,716 | 1/1990 | Aschwanden et al. . | |
| 5,243,418 | 9/1993 | Kuno et al. | 358/108 |
| 5,259,040 | 11/1993 | Hanna | 382/41 |
| 5,309,147 | 5/1994 | Lee et al. | 340/567 |
| 5,343,539 | 8/1994 | Chan | 348/421 |
| 5,387,947 | 2/1995 | Shin | 348/699 |
| 5,721,692 | 2/1998 | Nagaya et al. | 364/516 |
| 5,781,249 | 7/1998 | Hwang | 348/699 |

FOREIGN PATENT DOCUMENTS

| | | |
|---|---|---|
| 2249420 | 6/1992 | United Kingdom . |
| 8002096 | 2/1980 | WIPO . |

*Primary Examiner*—Chris S. Kelley
*Assistant Examiner*—Shawn S. An

[57] ABSTRACT

A motion detection system compares the differences between regions in a reference frame and regions in a subsequent frame to a threshold value. A difference frame is defined containing regions indicating which of the corresponding regions in the subsequent frame exceed the threshold difference when compared to the reference frame. Target and global parameters are defined so that a cluster of regions in the difference frame which indicate above threshold differences, must be greater than the target parameter but less than the global parameter for motion to be deemed to have occurred.

17 Claims, 4 Drawing Sheets

VIDEO MOTION DETECTOR WITH GLOBAL INSENSITIVITY

BACKGROUND OF THE INVENTION

1. Field of the Invention

This invention generally relates to security systems, specifically to security systems which employ video equipment for motion detection. Disclosed is a system which reduces the number of false alarms generated by video motion detector systems in response to video image changes which are not related to motion.

2. Discussion of the Related Art

Video systems are well known in the field of security systems. In a typical security system, one or more video cameras are placed so as to provide a field of view of the area under surveillance. These video cameras convert a visual image into an electronic form suitable for transmission. A control station, either co-located within the surveillance area or remote from the area, receives the signals from these cameras and displays the video image at a console, for security assessment and recording. Typically, a person monitors the images from the cameras on a video screen and initiates security measures if the received image indicates unauthorized activities. Often the monitoring person (hereinafter the monitor) is responsible for monitoring the images from multiple cameras simultaneously, and means are provided to assist in this process.

Automated motion detection systems are employed to alert the monitor of the presence of activity within the view of a camera, as typified in U.S. Pat. No. 4,458,266. These motion detection systems operate by detecting changes in the sequential electronic images of the same scene. A change in the scene implies the entry or exit of an item from that scene. When a change is detected, an alarm is sent to the monitor for a security assessment. The monitor will view the sequence of images which caused the alarm, as well as other images, from this camera or others, to determine whether the alarm requires the initiation of security measures such as notifying the police or activating a warning signal. These motion detection systems can be co-located with the camera, or remote from the camera. They are often co-located with the camera and operate so as to transmit the images to the control station only in the event of an alarm, thereby saving communications bandwidth and costs.

Environmental changes will cause the video image to change; for example, in an outside environment, the video image at sunset will be different from the video image at noon. Because motion detectors operate by comparing video images for changes, and environmental changes create such changes, means must be provided to avoid the generation of an alarm signal in response to environmental changes. Conventionally, noting that most environmental changes are slowly changing phenomenon, motion detection systems avoid the generation of alarms in response to environmental changes by comparing images which occur relatively closely spaced in time. That is, for example, instead of comparing the image at noon with an image at sunrise, the image at noon is compared to the image at a fraction of a second before noon. A person or object entering the scene will introduce a noticable change between images of a fraction of a second diffence in time, but the change of environment in that same fraction of time will be insufficient to trigger an alarm. In the conventional system, the compared image is continually updated, to maintain the fraction of time difference between images. That is, following the aforementioned comparison between the noon image and the noon-minus-a-fraction image, the noon-plus-a-fraction image is compared to the noon image, and so on.

This sequential compare and update process results in motion detection systems which are sensitive to relatively rapid changes to the scene, and are insensitive to relatively slow changes to the scene, as desired. Because they are sensitive to rapid changes in scenes, conventional motion detectors are sensitive to rapid environmental changes as well. A lightning bolt at night will cause a significant change to sequential video images, and will cause the motion detector associated with these images to generate an alarm, obviating their effectiveness during a lightning storm. The headlights of a car, illuminating the area within a camera's field of view, will also trigger erroneous alarms, which often limits the choice of placement or field of view of a security camera.

Security systems often also include a means for masking a portion of the image area from motion detection. Such systems allow movement within the masked areas, and sound an alarm for movement in other areas, both areas within the field of view of the camera. An interior scene may, for example, comprise a walkway adjacent to a secure area. Even though movement in the walkway can be masked to prevent alarms being generated in response to such movement, the turning on or turning off of the lighting for the walkway will cause the secure area image to change, resulting in a false alarm.

SUMMARY OF THE INVENTION

Essentially, the invention describes a motion detector system which is insensitive to environmental changes, including both rapidly and slowly changing scenes. This invention, in its preferred embodiment, minimizes the likelihood of false alarms while also minimizing the likelihood of bypassing a true alarm.

This invention is premised on the observation that environmental changes, as discussed above, produce changes to the entire scene, whereas movement within a scene is localized to a sub-area within the scene. In accordance with this invention, changes in the video images are assessed for a global scene change, affecting a large area of the scene. By assessing the images for changes affecting the entire scene, environmental changes can be distinguished from motion induced changes. Changes affecting the entire scene can be inhibited from generating alarms, thereby reducing false alarms.

In a further embodiment, the local changes are compared to the global scene change to determine if the local change is consistent with the global change. Local changes which are inconsistent with the global change are subsequently assessed for motion detection. In this way, motion induced local changes may trigger an alarm, even though a global change may have occured, contemporaneous with the local motion. This feature limits the use, on the part of an intruder, of a diversionary environmental change to mask the intruder's entry to a secured area.

These and other features of the invention will be readily apparent to one versed in the art, in light of the drawings and detailed description following.

DETAILED DESCRIPTION OF THE PREFERRED EMBODIMENTS OF THE INVENTION

Figure 1A:
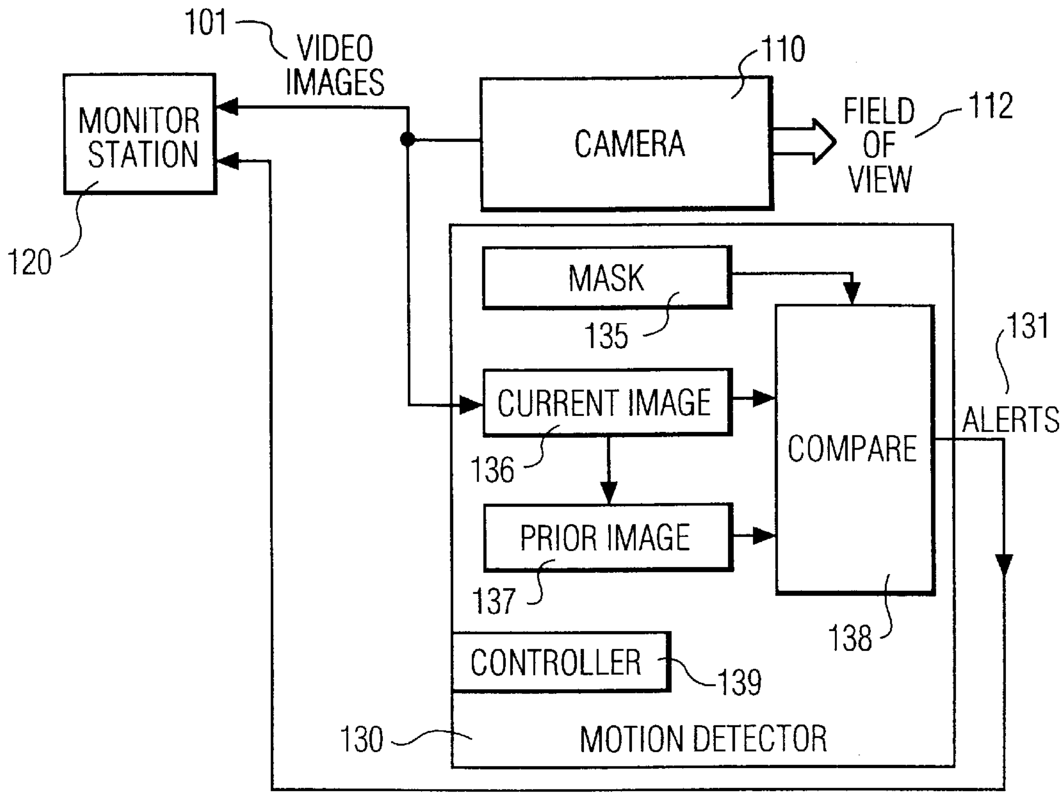
FIG. 1A PRIOR ART
FIG. 1 shows a video security system with motion detection.

FIG. 1 shows a video security system with a motion detector, as known in the current art. Video images 101 are produced by the camera 110. These images are representative of the camera's field of view 112. The field of view is established by the camera's location, orientation, and lens configuration. In FIG. 1*a,* the video images 101 are simultaneously sent to the monitor station 120 and the motion detector 130. The motion detector 130 compares a frame of the current image 136 to a frame of the prior image 137, under the control of a controller 139. The compare block 138 asserts an alert signal 131 whenever the current image 136 differs substantially from the prior image 137. The difference between the images may be measured by the number of picture elements (pixels) having a different value, for example. If the number of differing pixels exceeds a threshold value, an alert is transmitted to the monitor station. The use of a threshold allows the motion detector to be insensitive to small changes, such as caused when small animals traverse the camera's field of view. After comparison, via the controller 139, the current image 136 becomes the prior image 137, in preparation for receipt of the next frame of video image 101. The motion detector 130 may contain an optional mask feature, to block portions of the scene from motion detection. This blocking out, or masking, is performed by the mask block 135. The mask identifies areas of the image which should not be used by the compare block 138 in its determination of whether an alert signal 131 should be asserted. The mask is applied to block 138 so that the differences between those pixels of the current image 136 and the prior image 137, which correspond to the areas of the mask 135, are not used for asserting the alert signal 131. Note that, in a typical system, the monitor station receives the full, unmasked image, showing all motion, but the monitor is not alerted to motion except in the unmasked areas.

Figure 1B:
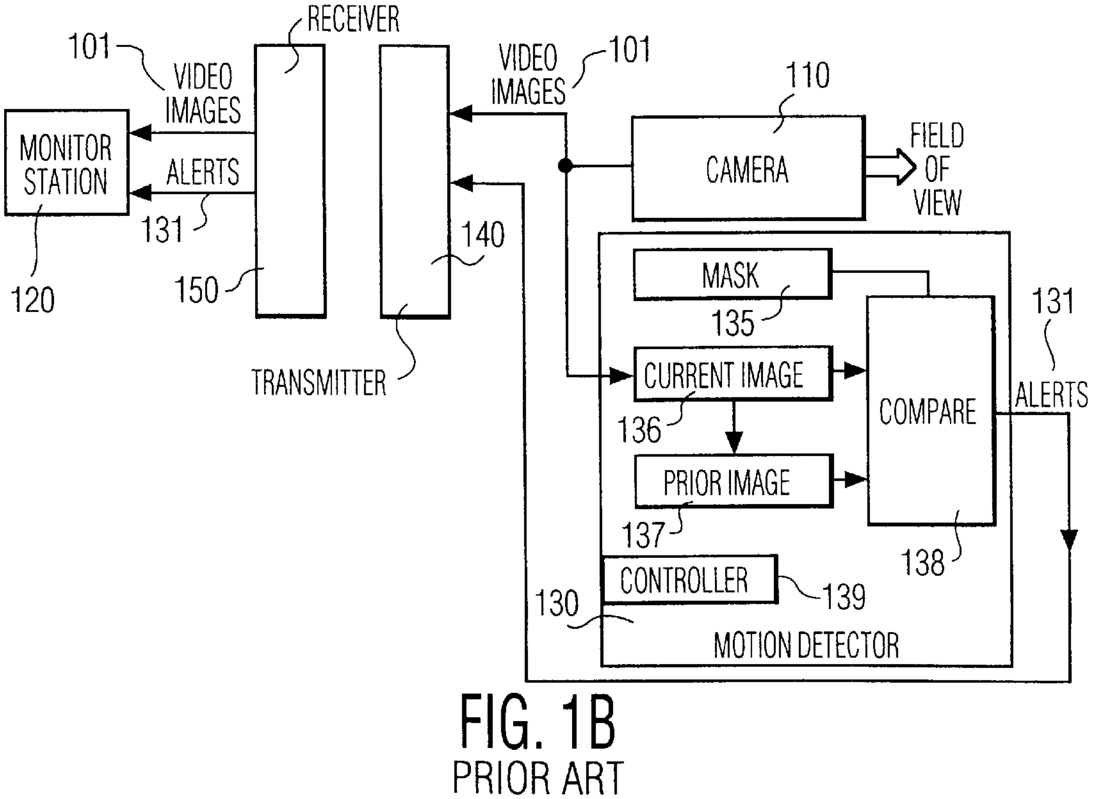
FIG. 1B PRIOR ART

FIG. 1*b* shows a security system with a remote monitor station. Images 101 and alerts 131 are communicated to the monitor 120 via the transmitter 140 and receiver 150. optionally, the transmitter 140 may be designed to only transmit video images 101 upon command from the monitor, or upon an asserted alert signal from the motion detector 131. Typically, the transmitter may contain one or more video image buffers. Upon the detection of motion, as signaled by the alert signal 131, the transmitter will transmit the current video image, as well as prior and subsequent images, to aid the monitor in an assessment of the security situation.

The motion detector 130 operates by comparing one image with another. Rather than comparing the images on a pixel by pixel basis, groups of pixels within an image are typically characterized by a single parameter, and this parameter is compared, image to image. In this disclosure, the term frame is used to describe this representation of the image, and within each frame are subelements referred to as MCUs. An MCU refers to a grouping of pixels having a comparable parameter. For example, an MCU may be defined as an 8 by 8 contiguous group of pixels, and the parameter of this MCU may be the average luminosity of these 8 by 8 pixels. A 320 by 240 pixel image would thus form a frame which is partitioned into a 40 by 30 matrix of 8 by 8 pixel MCUs, and the frame is stored as a 40 by 30 array of the average pixel value within each MCU. If the average value of an individual MCU changes substantially, from one image to the next, it can be assumed that something has entered or exited the scene. The size of the MCU can be as small as a single pixel; a larger size will result in the faster processing of sequential images, but with an accompanying loss of resolution.

Also typical of common motion detection systems, a parameter is provided to specify the minimimum size of an object which will trigger an alarm. This parameter may be specified as a minimum number of MCUS, or a particular arrangement of MCUs. For example, one may specify that motion must be detected in at least five MCUs before an alarm is triggered, or, in at least a two MCU by three MCU area. In this manner, small animals, for example, will not trigger alarms, even though the specific MCUs within which their image appear will show a difference from one frame to the next. The minimum sized area required to trigger an alarm is termed herein as the "target size".

Figure 2:
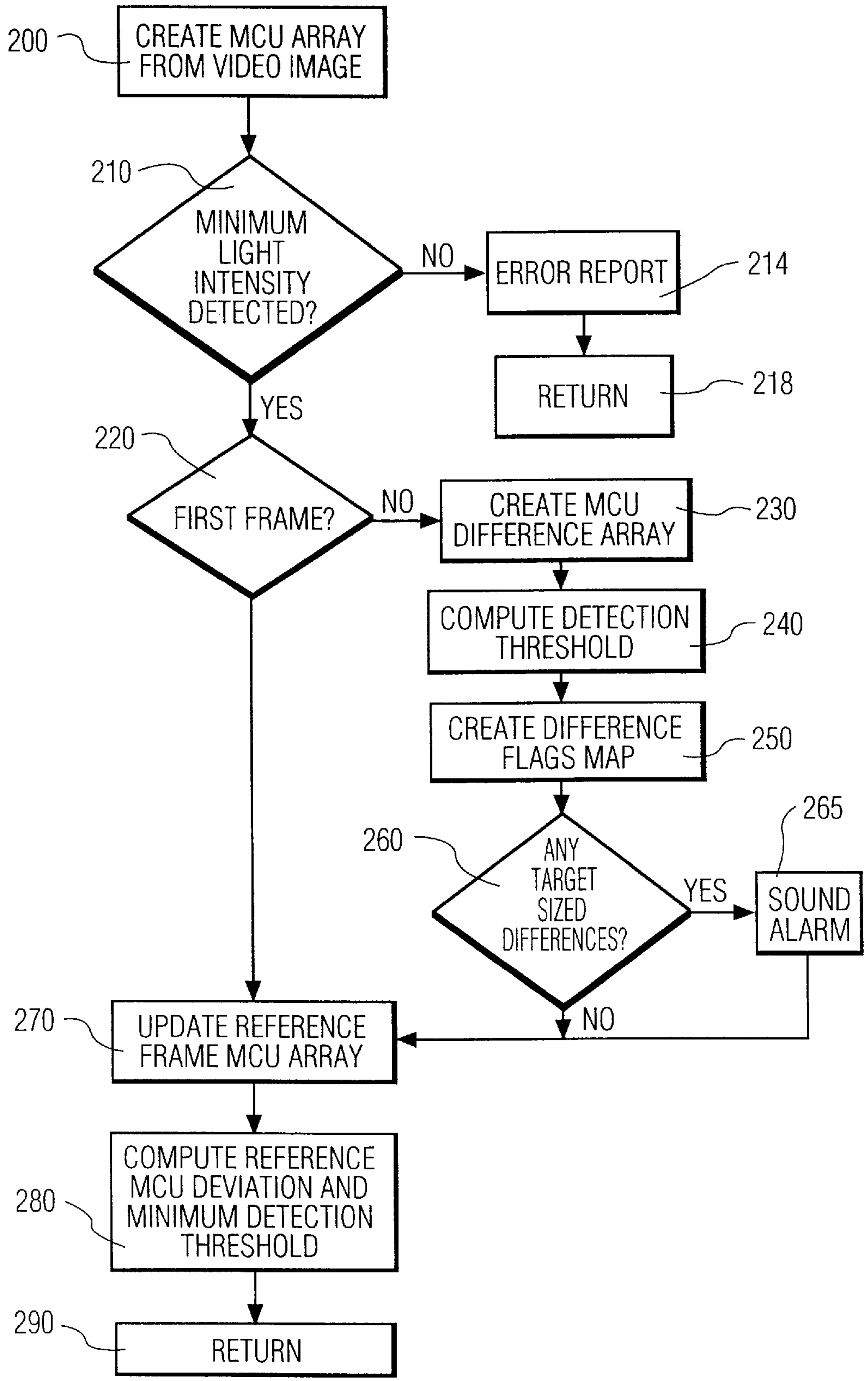
FIG. 2 shows a flowchart for motion detection with global change insensitivity, in accordance with this invention.

FIG. 2 shows a flowchart for a Motion Detection System in accordance with this invention. At block 200, the video image is processed to form a frame which is stored as an MCU array. As mentioned above, the MCU array contains parameters which characterize the image to the degree necessary for subsequent processing. Each MCU could correspond to a single pixel, and the frame could contain the entire video image, to whatever detail the camera 110 provides. To optimize processing, however, the frame is typically an abstraction of the image which contains sufficient detail to enable a comparison of one image to another, by comparing the parameters contained in one frame to another. In the preferred embodiment, an MCU represents an 8 by 8 grouping of pixels, and these 8 by 8 pixels are characterized by the average value of their luminance; other characteristics of the pixels, such as their composite color, could also be utilized, in addition to, or in lieu of, the luminance parameter. The MCU array is first assessed for a minimum light intensity, at 210. This assessment is performed as a self test of the system, and may include a test for a maximum intensity, minimum contrast, etc. This assessment also provides for an alert to a potential purposeful obscuration of the camera, as well. If insufficient light is detected, the error is reported 214 and no further processing is performed on this image.

If sufficient light is detected, an initialization test is performed at 220. If this is the first frame, a comparison cannot be performed, and the system proceeds directly to update the reference MCU array at 270. The reference MCU array is the MCU array to which subsequent MCU arrays are compared. In a typical embodiment, this array is merely a copy of the current MCU; however, it may be advantageous that the reference array is a composite of multiple prior images. For example, in the preferred embodiment, the reference MCU is a recursive weighted average of all prior images. This averaged MCU is found to be effective for suppressing rapid image changes as might be caused by rustling leaves and such, while allowing for gradual luminance changes as might be caused by sunrise, sunset, and so forth.

The reference MCU is assessed at 280 to compute parameters which will be used for the comparison of subsequent frames. For example, in the preferred embodiment, the variance or deviation in value among the MCU elements is indicative of the contrast contained in the image. This contrast can be utilized to set a minimum threshold for subsequent MCU comparisons. That is, in the subsequent MCU comparisons, only those changes which exceed this threshold will be flagged as noteworthy changes. The automatic adjustment of this threshold in proportion to the contrast provides for consistent motion detection performance, even under significantly different viewing conditions. If the image, for example, is produced on a bright sunny day, one would expect a significant amount of contrast in the image, and, correspondingly, significant changes in luminosity as the image changes, due either to the random motion of items within the scene, or due to an intruder. To minimize false alarms caused by random motions, the threshold value is set to be larger than the changes in luminosity expected to be caused by these random motions. Thus, the threshold should be high when the image contains a high degree of contrast. When the same scene is viewed on a cloudy day, the contrast will be lower, as will be the changes in luminosity as the image changes. The threshold value should be adjusted downward for a less contrasted image to approximately maintain the same degree of insensitivity to random motion while still maintaining the same degree of sensitivity to the entry of an intruder. By setting the threshold in dependence upon the contrast, the system provides for an automatic adjustment, thereby automatically maintaining this consistency. Having created the reference image, and having set the threshold level for subsequent comparisons, the process returns at 290, awaiting the next image to arrive at 200.

Upon receipt of a subsequent image, the image is processed to produce a new MCU array at 200, and checked for minimum light intensity at 210, as discussed above. If it is not a first frame, it is compared to the aforementioned reference MCU array to produce a Difference Array at 230. In the preferred embodiment, this is an element by element subtraction of each corresponding MCU within the current MCU and the reference MCU. The magnitude of the difference of each corresponding MCU is stored in the Difference Array.

If an individual MCU's difference factor exceeds a detection threshold value, as determined in 240, a Difference Flag is set, corresponding to this MCU, in a Difference Flag Map at 250. The Difference Flag Map will contain, for example, a one for each current MCU which differs from the reference MCU by the detection threshold amount, and a zero otherwise. An intruder would create a cluster of ones in this map at the location of the intrusion. The map is assessed at 260 to determine if any clusters exist which exceed the aforementioned target size. If one or more of such clusters exist, an alarm is sounded at 265. In either event, the reference array is updated 270 and assessed 280 and the process returns to await the next frame.

The updating of the reference array may be made to be dependent upon whether an alarm was sounded. It may be preferrable, for example, to not update the reference, pre-alarm, image until some action is taken in response to the sounded alarm. Similarly, other processing may be effected upon the sounding of the alarm, and this process may be bypassed for subsequent frames, to allow such processes to proceed uninterrupted.

Figure 3A:
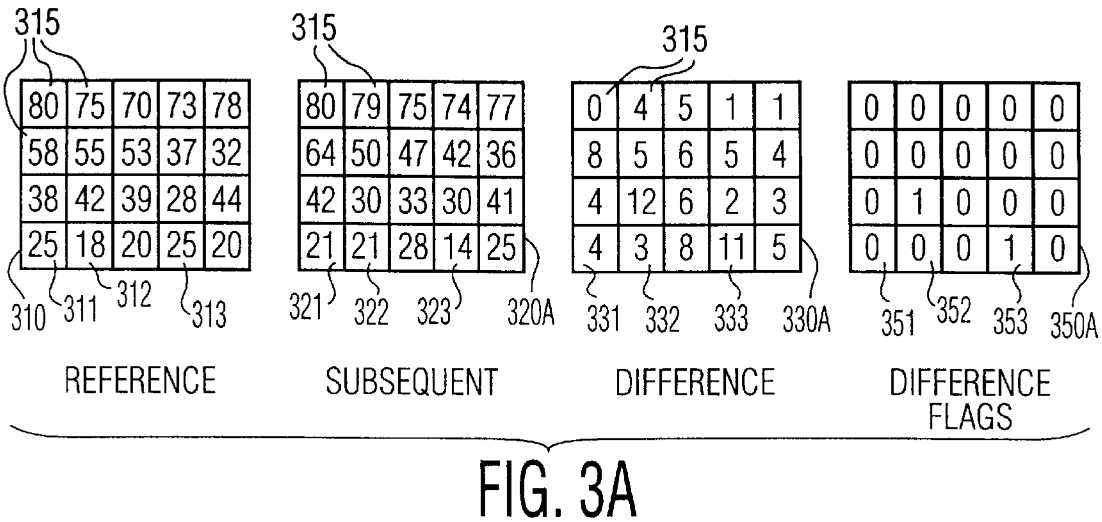
FIG. 3 shows frames corresponding to random, intruder induced, and global changes, in accordance with this invention.
Figure 3B:
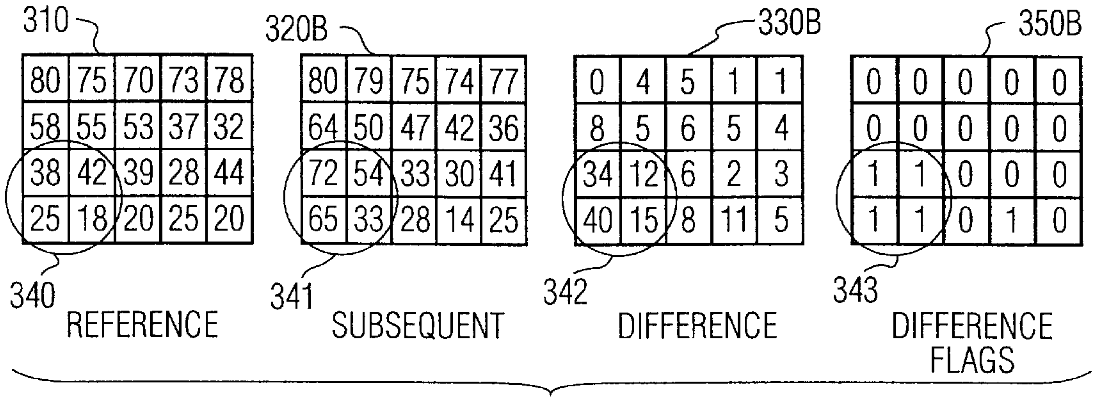
Figure 3C:
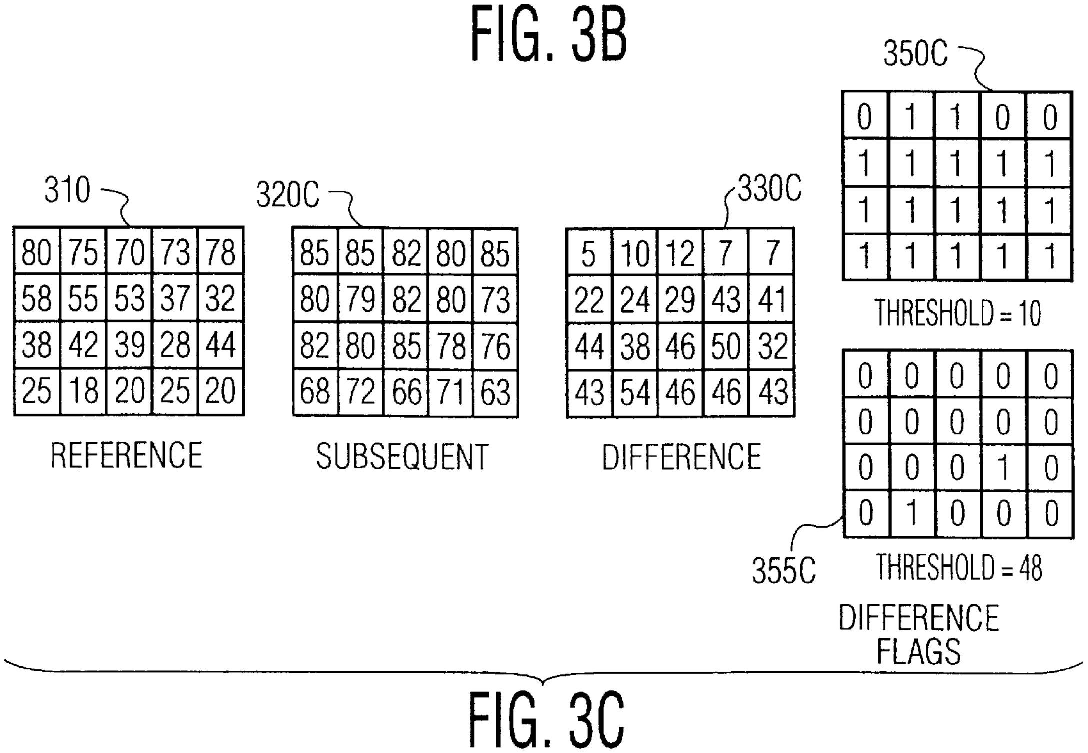

The operation of this flowchart is detailed in FIG. 3. FIG. 3A represents a scene subject to random changes in luminousity; FIG. 3B represents a scene upon the entry of an intruder; FIG. 3C represents a scene upon the occurrence of a global change. In each of these figures, the Reference frame 310 is the same. The Reference frame 310, the Subsequent frame 320A, 320B, 320C, and the Difference frame 330A, 330B, 330C each comprises twenty MCUs 315, arranged in a five by four matrix. Conceptually, these frames are arranged to represent a partitioning of a scene as might correspond to camera 110's field of view 112. For example, if the numbers shown within each MCU represent luminosity, the Reference frame 310 shows higher values in the upper region of the matrix, corresponding to the sky, or ceiling lights, while the lower regions have lesser values, corresponding to the ground, or flooring. Consistent with this invention, the structure and correspondence of the frame representation may take on alternative forms, for example, for more efficient processing.

In FIG. 3B, the Subsequent frame 320A has entries which are representative of random changes from the Reference frame. MCU 321 shows a value of 21, whereas the corresponding MCU 311 in the Reference frame shows a value of 25. The magnitude of the difference between MCU 321 and MCU 311 is shown as the value 4 in the corresponding Difference frame MCU 331. similarly, the values of MCU 332 and 333 correspond to the magnitude of the differences between MCUs 322 and 312, and MCUs 323 and 313, respectively.

Assuming a threshold value of ten, a Difference Flags map, as would be computed by block 250 in FIG. 2, is shown at 350A. The MCUs within the Difference frame 330A whose values are at least ten have a corresponding 1 in the Difference Flags map 350A. Difference Flags entry 353 has a value of 1, corresponding to the Difference MCU 333 value of eleven, while the Difference Flags entries corresponding to MCUs 331 and 332, with values 4 and 3 respectively, each have a value of 0 at 351 and 352. Although two of the entries in the Difference Flags map 350A contain a 1, if the target size parameter of block 260 in FIG. 2 is, for example, two contiguous MCUs, the alarm would not be sounded at 265.

FIG. 3B corresponds to the entry of an intruder in the area corresponding to the MCUs indicated at 341. The Difference MCUs at 342 show a large difference between the MCUs at 341 and the MCUs at 340. Correspondingly, the Difference Flags map shows a cluster of ones at 343. If this cluster exceeds the target size parameter, for example two contiguous MCUs, the alarm will be sounded at 265.

As noted above with reference to FIG. 2, the Difference Array is assessed at 240 and 250 to identify difference clusters. It is in this assessment that global changes may be distinguished. A global change can be expected to introduce changes to a majority of MCUs. Thus, if the Difference Array contains many changes, rather than a few localized changes, it may be inferred that a global change has occurred, rather than an intrusion. Any number of algorithms may be utilized to assess whether the changes are widespread or localized. For example, a count of the number of elements in the Difference Array which exceed a given minimum magnitude may be utilized. If this minimum magnitude is the same as the aforementioned threshold value, the count could be the number of flags set in the Difference Flags Map. If the count significantly exceeds that which might be expected by the entry of an intruder, the change can be declared global, and the alarm inhibited for this frame.

FIG. 3C corresponds to a global event, for example, the occurrence of a lightning bolt, or the flash of a flashbulb. The values of the MCUs of the Subsequent frame 320C show a marked increase in luminosity, which is reflected in the Difference frame 330C. If the threshold value is ten, as in the prior examples, most of the Difference Flags entries will be set to 1, as shown at 350C.

In accordance with this invention, the occurrence of a 1 in, for example, a majority of MCUs, may be used to signal the occurrence of a global event, for which the sounding of the alarm at 365 is inhibited. Because the Difference Map 350C contains a majority of entries of 1, in this example, the subsequent sounding of an alarm would be inhibited.

Thus, as presented, the assessment of the Difference Flags can be effectively utilized to distinguish local from global changes. This distinction can then be utilized to inhibit the sounding of a false alarm, as would be caused in a prior art system, by the occurrence of a global change.

Alternatively from the Difference Flags approach above, the variance of the elements within the Difference Array can be utilized to distinguish global from local changes. It would be expected that a global change would affect all elements similarly, and thus the variance among the magnitudes of difference would be small. A local intrusion, however, would introduce a difference in the area of intrusion and no difference in the other areas. Thus, a large variance would be typical of an intrusion. These and other methods of distinguishing global changes from localized changes in an array are common to one versed in the art, and are within the spirit and scope of this invention.

Figure 4:
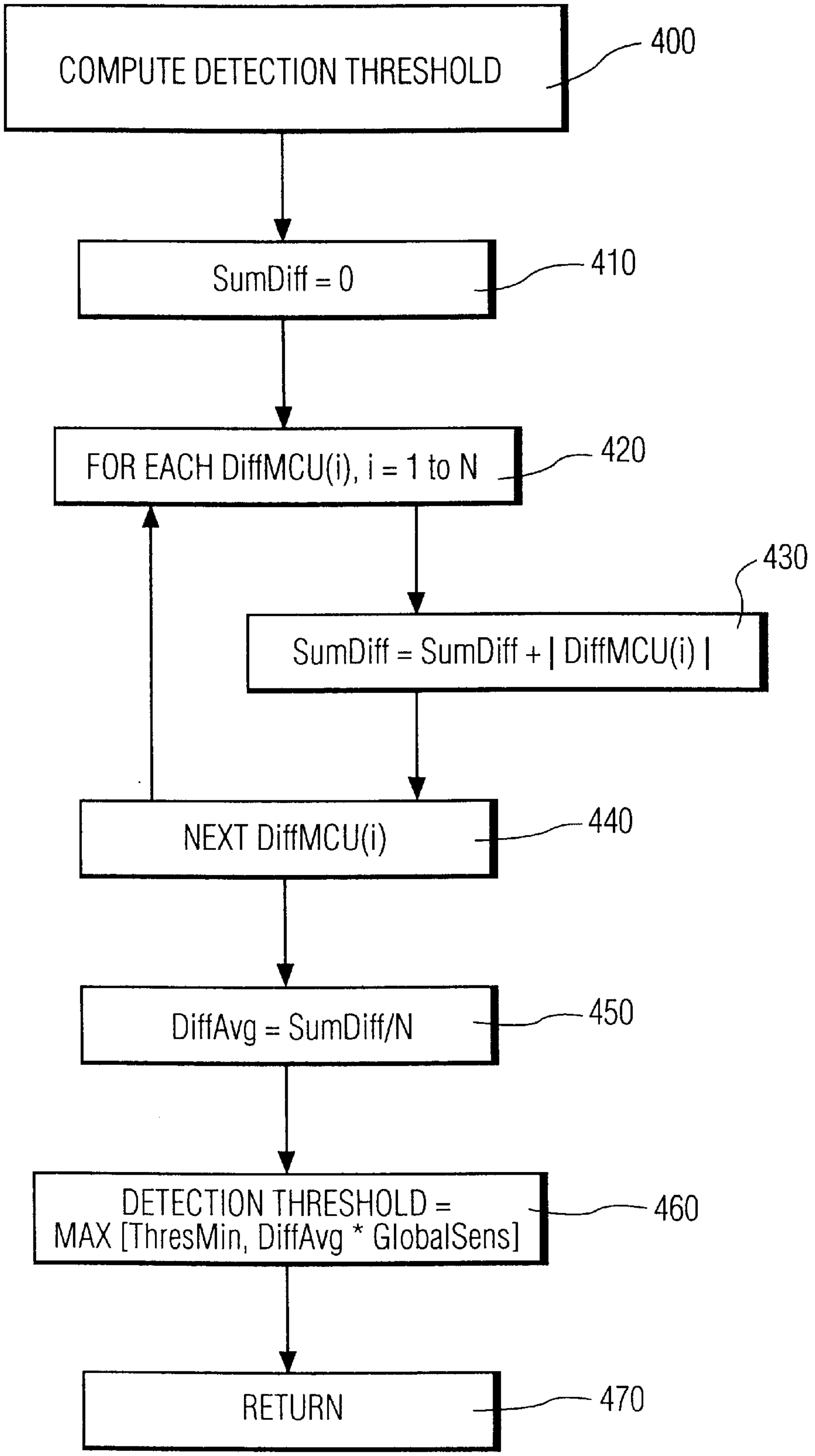
FIG. 4 shows a flowchart for computing a motion detection threshold.

Although the assessment of the difference array at blocks 240 and 250 could merely set an flag to inhibit the sounding of an alarm if a global change is detected, as discussed above, a further embodiment of this invention accomodates for the sounding of an alarm in the event of a simultaneous local and global change. In the preferred embodiment, the effect of a global change is accomodated by raising the threshold level for local motion detection. As shown in FIG. 2 and detailed in FIG. 4, the detection threshold is adjusted with each frame. The average of the magnitudes of the differences is computed as shown in steps 410 through 450 of FIG. 4. This average difference would be expected to be high for a global change, and low for a local change. This average, scaled by a global sensitiviy factor, is the detection threshold which will be utilized to set the difference flags in 250. As shown at 460, however, the detection threshold will not be set to be less than the Threshold Minimum established at block 280, discussed above. The global sensitivity factor may be a user definable factor, and is typically greater than one.

FIG. 3C shows the effect of an increased threshold at 355C. The Difference frame 330C produces Difference Flags 350C if a threshold value of ten is used, as discussed above, but the same frame 330C produces Difference Flags 355C if a threshold value of forty-eight is used. In accordance with this invention, the average value of the MCUs of Difference frame 330C is computed at blocks 410–450 to be thirty-two. Assuming a typical global sensitivity factor of 1.5 results in a Detection Threshold at 460 of forty-eight. As expected, the higher threshold value results in fewer MCUs exceeding this threshold value, and hence, fewer entries of 1 in the Difference Flags 355C.

The effectiveness of the above described dynamic detection threshold setting, in accordance with this invention, may best be appreciated by the example scenario, in a somewhat more general case, below.

Assume that the MCU values ranges from 0 (black image) to 100 (white image). Further assume that the image contrast is such that the threshold minimum is set to 10, that an intruder causes a difference of about 30 in ten percent of the image MCUs, and that the user has set the global sensitivity to 1.50. In the absence of a global change, assume an average difference between images of 5, as might be caused by random factors. In the absence of an intruder, this average difference (5) will be multiplied by the sensitity (1.5) and compared to the threshold minimum (10). Because the threshold minimum (10) is greater than this product (7.5), the detection threshold is set to 10. Any MCUs having a difference of at least 10, as might be caused by the random entry of a small animal, would result in the corresponding difference flag to be set. Only if a cluster of set flags is larger than the target size will an alarm be sounded at 265.

Consider the entry of an intruder, absent a global change. The intruder will introduce a change in the average difference of about 3 (30 times 10 percent), resulting in a DiffAvg at 450 of 8. At 460, the detection threshold is set to the higher of the threshold minimum (10), and the DiffAvg (8) times the GlobalSens (1.5); that is, the detection threshold is adjusted higher, to 12, because of the entry of the intruder. Each of the MCUs in which the intruder introduced the change of 30 units, when compared to this threshold of 12, will result in the corresponding difference flag being set. Assuming that the set flags corresponding to the intruder exceed the specified target size, the alarm will be sounded, at 265.

Consider now a global change, with no intruder. The magnitude of the difference introduced will be dependent upon the particular global change. Consider an occurrance which causes the average difference in MCU values to increase to 40, as computed at 450. Traditional motion detectors would sound an alarm under these conditions, because a majority of the MCUs will exceed the threshold minimum, and significantly large clusters of difference flags will be set. In accodance with this invention, however, the detection threshold at 460 will be adjusted up to a value of 60 (40 times the global sensitivity factor of 1.50). Only the locales wherein the change is significantly greater than the average change of 40 will have a difference flag set. Because a global change can be expected to affect the entire image relatively uniformly, such locales can be expected to be minimal. With few, if any, flags set, an alarm will not be sounded. Thus it is apparent that the dynamic adjustment of threshold values in dependence upon the average change in MCU values between frames has the desired effect of minimizing the number of false alarms caused by global changes.

Finally, consider a global change coincident with an intruder, for example, an intruder during a thunderstorm attempting to evade detection by moving only when a lightning flash occurs. A traditional security system may sound an alarm, but it may have minimal effect because the monitor will interpret it as a false alarm triggered by the lightning. In all likelihood, the traditional security system monitor will have turned off the motion detector after the first few lightning induced false alarms. The preferred embodiment herein disclosed, however, will be able to distinguish the intruder from the global changes. When local and global changes occur, the average difference will be somewhat less than the sum of both occurrances, because the effects of one may reduce the effects of the other. For the ease of understanding, however, let us assume the effects are approximately additive, such that in the example environment, most of the intruder affected MCUs rise to almost 70 when the other MCUs rise to about 40, and produce a difference average at 450 of about 42. The combined global and intruder changes will thus result in a detection threshold of 63 (42 times 1.50). Since most of the intruder affected MCUs are above this threshold minimum, the correponding difference flags will be set at 250, and the alarm sounded at 265. Thus it is seen that with this preferred embodiment, local changes will be detected even when they occur coincident with a global change. The likelihood of missing a true intrusion because of the occurrence of global changes is thereby significantly reduced through the use of this preferred embodiment.

Alternative techniques may be employed to adjust the threshold. For example, the variance of the differences may be utilized to further modify the global sensitivity factor, similar to the technique employed to adjust the threshold minimum discussed above with regard to process 280 in FIG. 1. For example, if the global occurrance has the effect of washing out most of the image, producing little contrast, the global sensitivity in the prior example may be reduced to 1.20, so that differences which exceed the average by only 20 percent, rather than the former 50 percent, will have their corresponding difference flag set.

Although the preferred embodiment operates by adjusting the threshold, equivalent techniques may be employed to accomplish the same effect. For example, the original MCU array corresponding to the image could be modified by an amount dependent upon the average change, and conventional motion detection techniques applied to this modified array. That is, consistent with this invention, characteristics which can be associated with a global change can be removed from the original image. Subsequent motion detection on this modified representation of the image results in motion detection which is insensitive to global changes while still comprising local motion detection capabilities.

Likewise, alternative algorithms may be employed, consistent with the spirit and scope of this invention. For example, noting that global changes are typically unidirectional, i.e. affecting all MCUs in either the positive or negative direction, alternate sums of differences could be computed in 430. That is, a sum of positive changes and a sum of negative changes. The larger of these sums could be attributed to a global change, and the threshold could be set based on the higher average. Or, it may be noted that global random changes, such as trees blowing, or animals scurrying, typically result in some positive changes and some negative changes, due to the random nature of these events. The difference between the sum of the positive changes and the sum of the negative changes could be utilized to adjust the detection threshold, thereby minimizing the effects of random differences.

This invention teaches that false alarms can be minimized by distinguishing the effects of global changes from local changes. Known statistical and heuristic techniques exist for distinguishing among effects caused by multiple causes, and are well suited for this application. A chi-square test, for example, could be utilized to determine which individual MCUs are significantly different from the population of all MCUs. Or, an ANOVA (ANalysis Of Variance) test can be applied to determine if the differences as measured by the MCU elements are consistent with a global event or a local event, by assessing the MCUs in a row and column fashion. In a global event, individual rows or columns should not exhibit significantly different characteristics, as other rows or columns. An intruder, on the other hand, will introduce a variance in the rows and columns common to the area of intrusion. Such an ANOVA technique might best be employed, for example, in environments wherein global changes are not unidirectional. For example, most cameras contain automatic lens aperture adjustment for changing light conditions. When exposed to a sharp increase in light intensity, the image of such light compensating cameras will show a increase in the lighted areas, as well as a decrease in shaded areas.

Similarly, although for ease of implementation, the preferred embodiment operates by comparing a single current image to a single reference image, the principles embodied herein are equally applicable to the comparison and assessment of series of images, to distinguish local from global changes.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for detecting motion in sequential images, said method comprising the steps of:

defining a target size parameter indicating a minimized area to trigger an alarm, defining a global change parameter, creating a reference frame in dependence upon one or more first images, creating a subsequent frame in dependence upon a second image, dividing said reference frame and said subsequent frame into a plurality of regions;

comparing corresponding regions in said subsequent frame and said reference frame to a threshold thereby forming a difference measure frame composed of difference measure regions, identifying difference measure regions with a value substantially different from other of said difference measure regions, generating an alarm signal when a number of contiguous substantially different difference measure regions is greater than said target size parameter, and said number of contiguous substantially different difference measure regions is less than said global change parameter.

2. A method for detecting motion as claimed in claim 1, wherein the step of generating an alarm signal comprises the steps of:

comparing the number of difference measure regions to said target size parameter to form a detect signal, comparing the number of difference measure regions to said global change parameter to form an inhibit signal, and generating an alarm signal in dependence upon said detect signal and said inhibit signal.

3. A method as claimed in claim 1, wherein said comparison is determined in dependence upon the luminance of said regions of said images.

4. A method as claimed in claim 1, wherein the identification of said difference measure regions whose values are substantially different from the value of the other difference measure regions comprises the steps of:

computing an average value of all the difference measure regions of the difference frame, and, comparing each difference measure region's value to said average value.

5. A method as claimed in claim 1, wherein the identification of difference measure regions whose values are substantially different from the value of other difference measure regions comprises a statistical test for significant differences.

6. A method as claimed in claim 1, wherein said step of generating of an alarm signal is further dependent upon a characteristic of said first images.

7. A method as claimed in claim 6, wherein said characteristic of the first images is correlated to a contrast measure.

8. A method as claimed in claim 7, wherein said threshold is determined based upon said contrast measure.

9. A motion detection system comprising:

means for creating a reference frame in dependence upon one or more first images, means for creating a subsequent frame in dependence upon a second image, said frames being composed of a plurality of regions;

means for comparing regions in said subsequent frame to corresponding regions in said reference frame with respect to a threshold thereby forming a difference frame composed of difference measure regions, means for creating a target parameter indicating a minimized area to trigger an alarm, means for creating a global parameter, means for identifying difference measure regions with values substantially different from other of said difference measure regions, means for creating a motion detection signal when a number of contiguous substantially different difference measure regions is greater than said target size parameter and said number of contiguous substantially different difference measure regions is less than said global change parameter.

10. A motion detection system as claimed in claim 9, wherein said means for creating the reference frame comprises means for computing a weighted average of one or more characteristics of said first images.

11. A motion detection system as claimed in claim 9, wherein said means for generating a motion detection signal is dependent upon one or more characteristics of said first images.

12. A motion detection system as claimed in claim 11, wherein one of the characteristics of the first images is a contrast factor.

13. A motion detection system as claimed in claim 9, wherein said regions of said first and second images are characterized by a luminance measure, and said means for comparing is based upon the luminance measure of the corresponding first and second subareas.

14. A motion detection system comprising:

means for creating a reference frame in dependence upon a first image, means for creating a subsequent frame in dependence upon a second image, means for comparing said reference frame and said subsequent frame to a threshold factor thereby forming a difference frame, said difference frame comprising a plurality of sub-elements, means for defining a target size parameter indicating a minimized area to trigger an alarm, means for defining a global change parameter, means for identifying sub-elements which have a value substantially different from other of said sub-elements; and means for producing a motion detection signal when a number of contiguous substantially different sub-elements is greater than said target size parameter and said number of contiguous substantially different sub-elements is less than said global change parameter.

15. A motion detection system as claimed in claim 14, wherein said sub-elements correspond to portions of said second image, each of said sub-elements having a value representative of the difference between said corresponding portion of the second image and the reference image, and said threshold factor is a statistic of said sub-element values.

16. A motion detection system as claimed in claim 14, wherein said means for determining a threshold factor is further dependent upon a characteristic of said first reference frame.

17. A motion detection system as claimed in claim 14, wherein said means for creating a reference frame is further dependent upon one or more prior images.

* * * * *